(12) United States Patent
Masek et al.

(10) Patent No.: US 11,669,371 B2
(45) Date of Patent: Jun. 6, 2023

(54) AUTOMATED INSTANTIATION OF VIRTUAL PRODUCTION CONTROL ROOM

(71) Applicant: NBC UNIVERSAL MEDIA, LLC, Universal City, CA (US)

(72) Inventors: Michael Masek, Milford, CT (US); Zachary Spencer Madell, New York, NY (US); Steven Sneddon, Maplewood, NJ (US); Christopher V. Swisher, Maplewood, NJ (US); Christopher Joseph Zembower, Brooklyn, NY (US); Kevin Fornito, Queens, NY (US)

(73) Assignee: NBC UNIVERSAL MEDIA, LLC, Universal City, CA (US)

(*) Notice: Subject to any disclaimer, the term of this patent is extended or adjusted under 35 U.S.C. 154(b) by 36 days.

(21) Appl. No.: 17/239,408

(22) Filed: Apr. 23, 2021

(65) Prior Publication Data

US 2021/0357265 A1    Nov. 18, 2021

Related U.S. Application Data

(60) Provisional application No. 63/025,928, filed on May 15, 2020.

(51) Int. Cl.
*G06F 9/46* (2006.01)
*G06F 9/50* (2006.01)

(52) U.S. Cl.
CPC .......... *G06F 9/5044* (2013.01); *G06F 9/5033* (2013.01); *G06F 9/5055* (2013.01)

(58) Field of Classification Search
CPC ..... G06F 9/5044; G06F 9/5033; G06F 9/5055
See application file for complete search history.

(56) References Cited

U.S. PATENT DOCUMENTS

2020/0059420 A1    2/2020  Abraham

OTHER PUBLICATIONS

European Patent Office Application Serial No. 21173916.4, Search Report dated Oct. 25, 2021, 12 pages.
Stefanic Polona et al., "SWITCH workbench: A novel approach for the development and deployment of time-critical mircoservice-based cloud-native applications," Future Generation Computer Systems, vol. 99, Apr. 2019, 16 Pages.

*Primary Examiner* — Gregory A Kessler
(74) *Attorney, Agent, or Firm* — Lee, Hong, Degerman, Kang & Waimey PC

(57) ABSTRACT

Systems and methods for providing an environment for creating media content are disclosed. According to at least one embodiment, a method for providing an environment including a virtual production control room (VPCR) for creating media content is disclosed. The method includes: requesting, from a user, information regarding the environment to be provided; receiving, from the user, the information; and creating the environment by provisioning a plurality of resources for the VPCR from among a plurality of cloud computing resources based on the received information.

14 Claims, 10 Drawing Sheets

US 11,669,371 B2

AUTOMATED INSTANTIATION OF VIRTUAL PRODUCTION CONTROL ROOM

CROSS-REFERENCE TO RELATED APPLICATION(S)

Pursuant to 35 U.S.C. § 119(e), this application claims the benefit of U.S. Provisional Patent Application No. 63/025,928, filed May 15, 2020, the contents of which are hereby incorporated by reference herein in its entirety.

BACKGROUND

The production of live media content (such as television programs or a podcast) may require use of a production control room, which encompasses hardware and/or firmware equipment that is located in physical premises such as a building or a facility. Physical production control rooms are not only expensive to build but also could take months to set up. Physical production control rooms are typically configured by human operators who are also located at the physical premises. While some pieces of equipment in a physical production control room may be operated remotely, remote access may not facilitate operation of all or key pieces of hardware and/or firmware equipment. For example, it may be difficult to dynamically allocate and access, from a remote location, equipment such as a video switcher or an audio mixer, and have the equipment correctly configured for communicating with each other and with a remote user.

In other aspects, high-performance computing workstations may be used in the production of media content (e.g., graphic art, editorial content, television programs for either broadcast or other forms of distribution, etc.). Such workstations are used by individuals including media artists and video editors. While using such workstations to perform tasks relating to the production of media content, these individuals may value features relating to system performance, responsiveness, speed, render times, color and/or lag times.

However, the costs associated with providing production control rooms and production workstations may be quite high. These costs include not only the costs associated with purchasing hardware, but also the costs associated with maintaining the hardware over time. Also, as these are normally dedicated facilities, the equipment may remain dormant and underutilized for large percentages of time.

SUMMARY

With respect to various embodiments disclosed herein, techniques are described for reducing a reliance on physical hardware and/or firmware that is used in the production of media content. For example, according to at least one embodiment, one or more virtual production control rooms (VPCRs) are instantiated to facilitate production of different pieces (or the same piece) of media content. The creation and configuration of the VPCR may be based on specific needs that have been indicated, and may be performed in an automated manner. Accordingly, various embodiments are directed to providing users with an automated product delivery.

According to at least one embodiment, a method for providing an environment including a virtual production control room (VPCR) for creating media content is disclosed. The method includes: requesting, from a user, information regarding the environment to be provided; receiving, from the user, the information; and creating the environment by provisioning a plurality of resources for the VPCR from among a plurality of cloud computing resources based on the received information.

According to at least one embodiment, a system for providing an environment including a VPCR for creating media content is disclosed. The system includes one or more controllers configured to: request, from a user, information regarding the environment to be provided; receive, from the user, the information; and create the environment by provisioning a plurality of resources for the VPCR from among a plurality of cloud computing resources based on the received information.

According to at least one embodiment, a method for providing content at a virtual production control room (VPCR) provisioned by a plurality of cloud computing resources is disclosed. The method includes: receiving, from a source, input content data; processing the input content data to produce output content data; and providing the output content data for transmission to a destination.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Features of various embodiments may be described, for purposes of illustration, with reference to cloud computing services such as Amazon Web Services (AWS) or Microsoft Azure. However, it is understood that such features may apply to cloud computing services offered by other public cloud providers or private cloud solutions or hosted internally. The use of such cloud computing services reduces a reliance on physical hardware and/or firmware that is typically employed in the production of live media content such as film and television programs. Also, the use of cloud computing services improves remote accessibility of production resources that are implemented using the cloud computing services.

Figure 1:
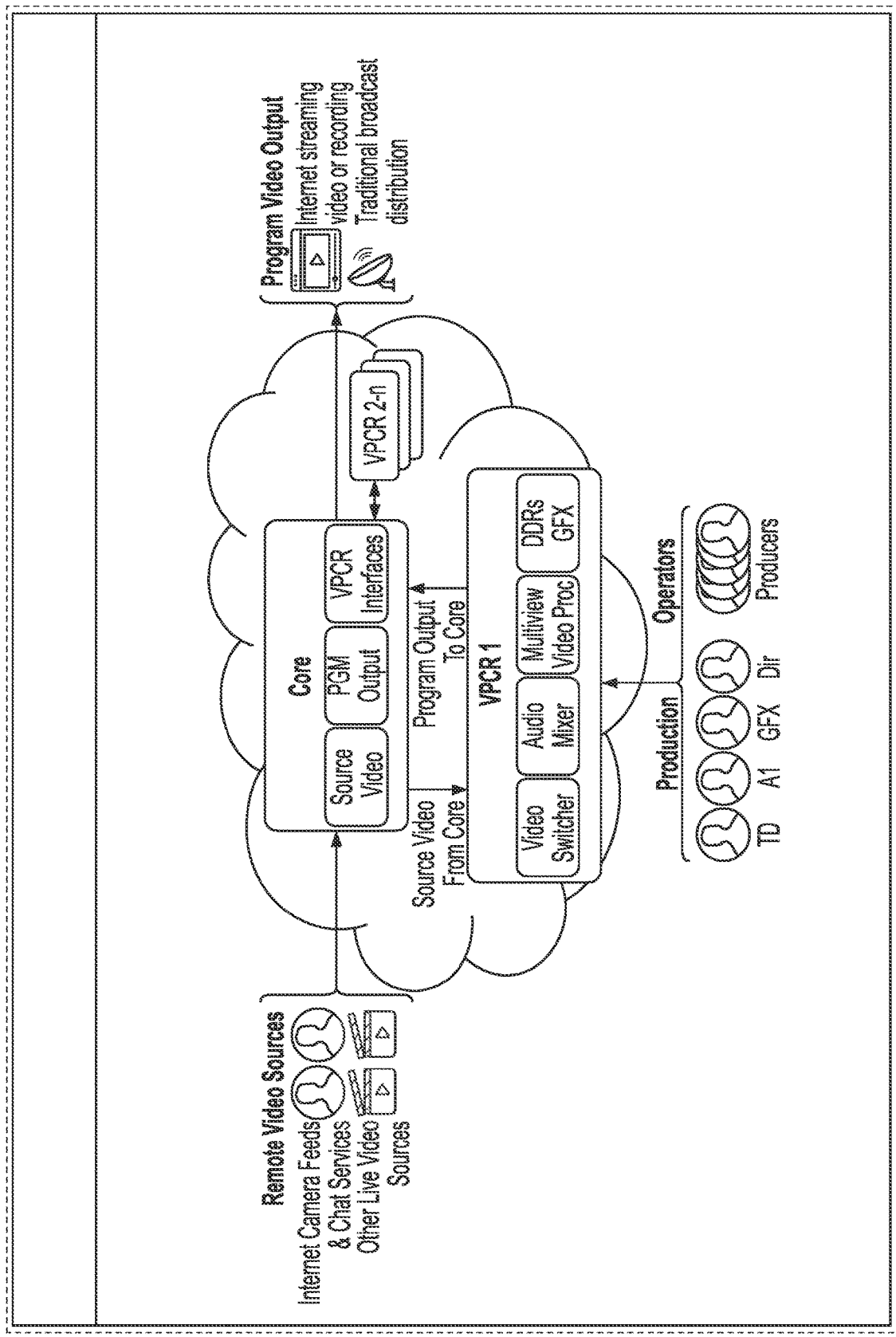
FIG. 1 is a diagram of an example environment for operation of a virtual production control room (VPCR) according to at least one embodiment.

FIG. 1 is a diagram of an example environment for operation of a virtual production control room (VPCR) according to at least one embodiment. Aspects of this disclosure are directed to instantiating such a virtual entity. According to at least one embodiment, a VPCR is capable of facilitating production of media content similar to that facilitated by a conventional production control room (PCR).

A PCR is a facility (e.g., room) in which individuals are co-located together to produce media content. For purposes of illustration, features of a PCR will be described with reference to producing a live or recorded television show. However, it is understood that the described PCR may be used for producing other forms of media content (e.g., video content, audio content, etc.) Individuals located in the PCR include production operators. Such production operators may include a director (Dir), a technical director (TD), an audio director (AI), a graphics (GFX) operator, one or more other producers, and other personnel. The director may be a director of a live television show. Under the direction of the director, the TD operates technological equipment that is installed in the PCR. For example, the TD may manually operate buttons and controls included in one or more pieces of equipment, in order to control which source of video appears live on-air at the direction of the director. For example, the source of the video may be a particular camera, a digital file containing prerecorded video, or prepared graphics. As illustrated in FIG. 1, the source of the video may be a remote video source (e.g., an Internet camera feed, a chat service and/or some other source of live video).

The GFX operator controls graphics that are to be shown on-air and controls playback of such graphics. The audio director operates an audio console. The one or more other producers may have more editorial roles. For example, such other individuals may include content producers or writers.

The media content produced by the individuals in the PCR may be output (or distributed) in one or more ways. For example, the media may be distributed via broadcast antennas for over-the-air (OTA) distribution. As another example, the media may be distributed over the Internet, e.g., via Internet stream or recording.

As noted earlier, a VPCR is capable of facilitating production of media content similar to that facilitated by a conventional PCR. According to at least one embodiment, a VPCR includes resources that are implemented using cloud computing resources (i.e., resources located in a cloud computing environment).

Referring to FIG. 1, the VPCR may be coupled to a core entity, which may also be implemented using cloud computing resources. The core serves as an interface to the VPCR from remote video sources, a master control, and other VPCRs. Unlike the VPCR, which may be configured to be disassembled at a given time (e.g., per the lifespan of a particular television production), the core serves as a more permanent entity that is capable of receiving inputs such as remote input feeds even as one or more VPCRs cease to exist. Further, the core is capable of interfacing with new VPCRs as they come into existence.

A single core may be coupled with one or more VPCRs. For example, as illustrated in FIG. 1, the core is coupled with VPCR1 and other VPCRs (VPCR2, . . . , VPCRn). As such, in the environment illustrated in FIG. 1, multiple VPCRs may be coupled with a particular core and multiple VPCRs may be configured to communicate with each other via the core.

As will be described in more detail later, a VPCR may be instantiated on demand (e.g., based on requirements specified by an end user). For example, the VPCR may be instantiated in association with the production of a new television show. Aspects of the disclosure will be described with reference to an automated instantiation of a VPCR. However, it is understood that one or more core environments may also be instantiated in a similar fashion.

As will also be described in more detail later, production operators may access resources of a VPCR via remote access protocols. As such, production operators need not be present at a designated physical location (e.g., a facility in which hardware and/or firmware equipment is installed) in order to carry out their respective functions and responsibilities. As will also be described in more detail later, resources of a VPCR may be configured in an automated manner, such that the resources that relate to the functions and responsibilities of a particular production operator are accessible by that production operator independent from the operator's geographical location. Further, although FIG. 1 depicts a core serving as an interface, in other embodiments, the core may be absent, and users may directly communicate with a VPCR (and VPCRs may directly communicate with each other). This scenario is more likely when VPCRs are more static and not dynamically created or wound down as quickly and where there may only be a limited number of VPCRs (e.g., a single VPCR) so coordination is less complex. In another embodiment, a core topology may be provided such that a first subset of VPCRs may be associated with a first core, a second subset of VPCRs may be associated with a second core, where the first and second cores are located in different geographical locations, and the first and second cores are child nodes of and associated with a master core that interfaces with users and facilitates communication between the cores and their respective VPCRs.

Figure 2:
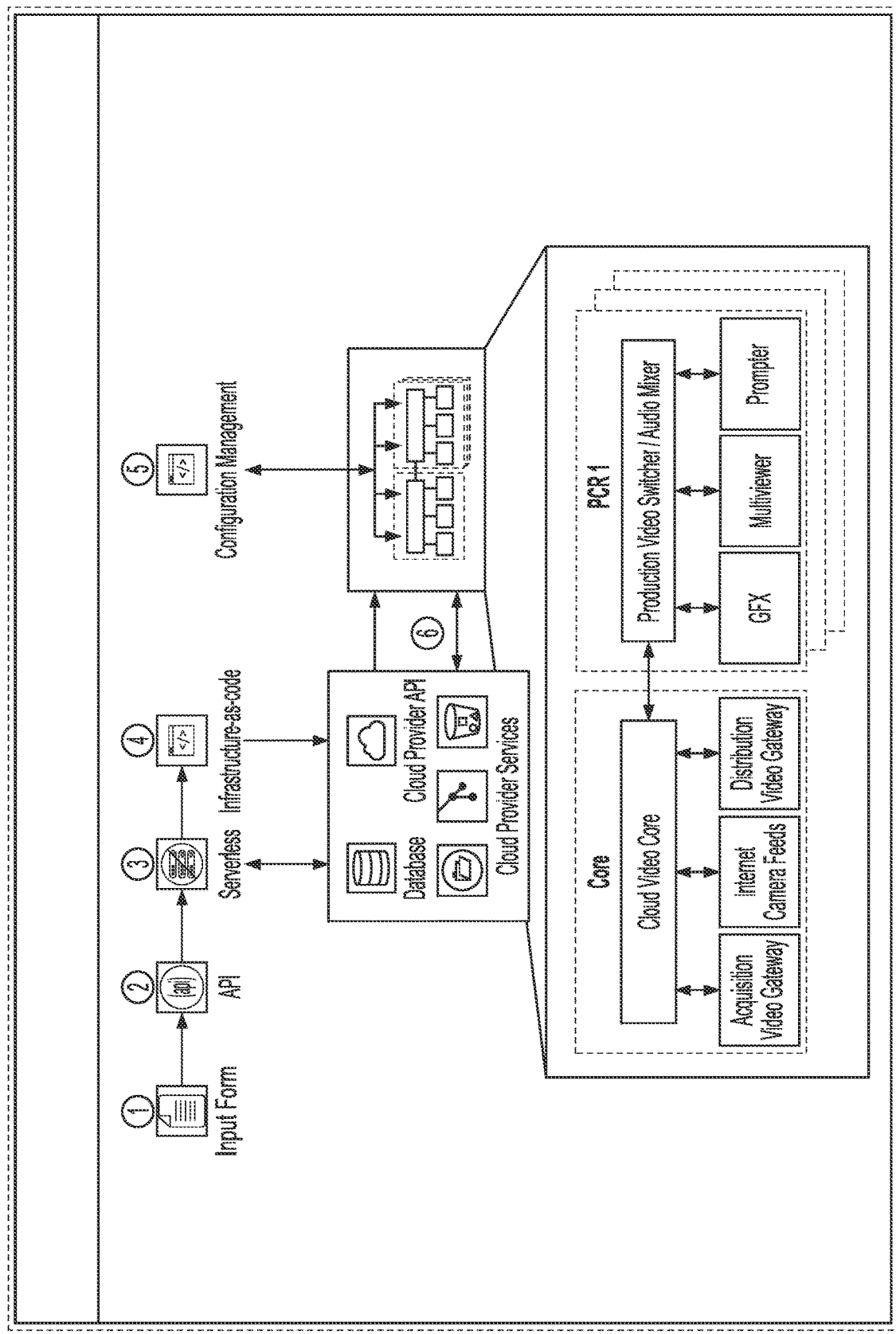
FIG. 2 illustrates an overview of operations that may be performed during a process of providing an automated instantiation of a VPCR according to at least one embodiment.

FIG. 2 illustrates an overview of operations that may be performed during a process of providing an automated instantiation of a VPCR according to at least one embodiment.

With reference to FIG. 2, operations may include receiving input(s) from one or more end users. The received input supplies parameters and/or variables that specify the desired end-state of the VPCR that is to be instantiated. The operations may also include translation of the received input into function triggers. The translation may be performed by an application programming interface (API). Further, the operations may include referencing databases and building information (e.g., metadata) to provision the production room environment. The referencing of databases and building of metadata may be performed by serverless code functions (e.g., software code functions). In addition, the operations may also include provisioning (or assembling) the necessary systems, networking and storage to instantiate the environment. According to at least one embodiment, such resources are provisioned from among (or using) cloud computing resources using a configuration manager. The configuration manager may be located in a cloud computing environment and may be separate from (or part of) the core.

Operations identified in the prior paragraph will be described in more detail later with reference to the flow diagram of FIG. 4.

With continued reference to FIG. 2, operations are performed for configuring a provisioned environment. Such operations may include performing orchestration associated with joining a domain, installing software, and configuring the provisioned system based on the inputs provided by the end user. Such operations may also include providing information (e.g., metadata) about the newly provisioned environment. Such information may be provided, e.g., to databases, so that the information can be requested by a front-end and other external entities (e.g., external tools).

Operations identified in the prior paragraph will be described in more detail later with reference to the flow diagram of FIG. 5.

Figure 3:
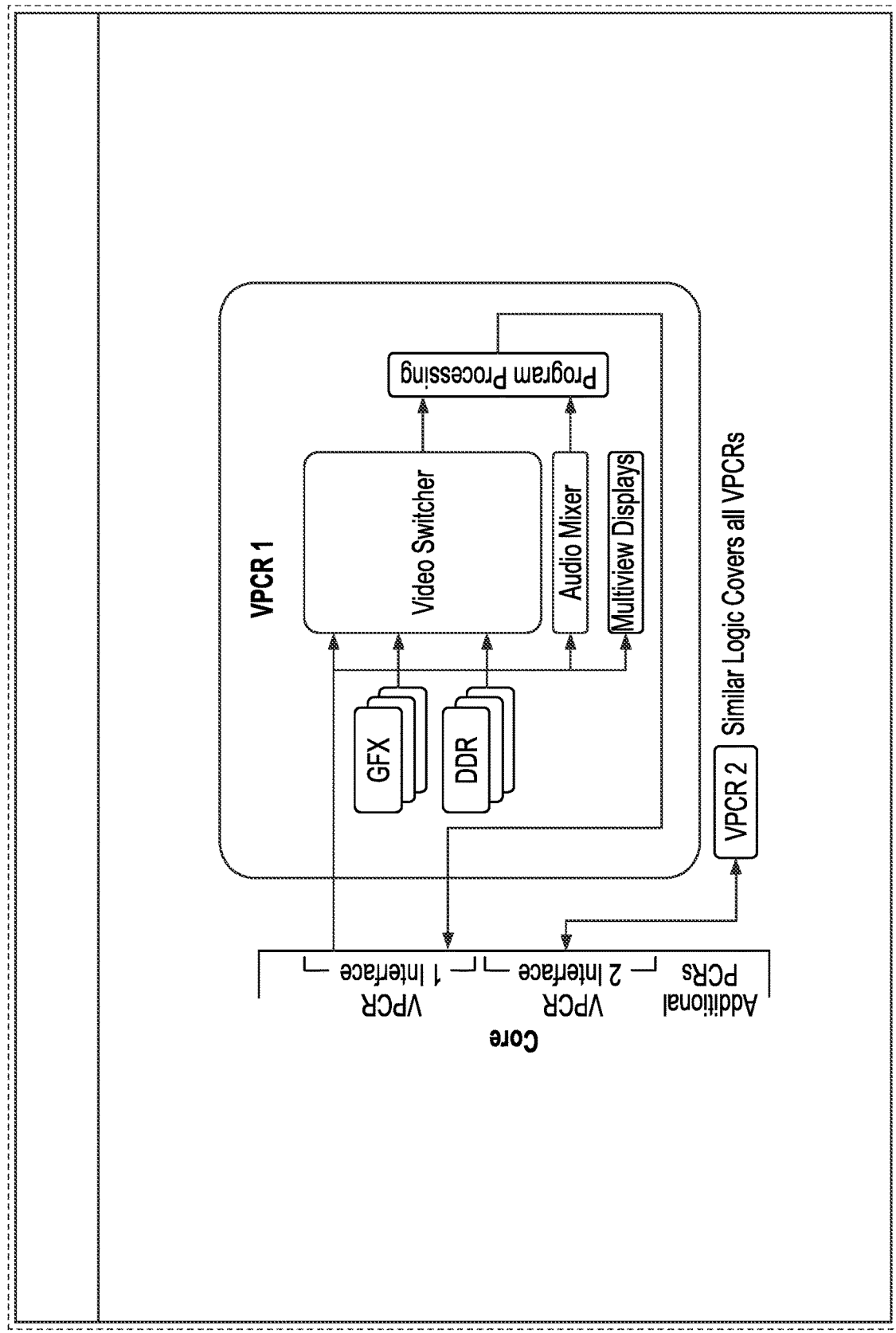
FIG. 3 is a block diagram of a VPCR according to at least one embodiment.

FIG. 3 is a block diagram of a VPCR1 according to at least one embodiment. As illustrated also in FIGS. 1 and 2, the VPCR1 is coupled via a core that includes pre-defined video input and output points for the VPCR1 and for one or more other VPCRs. The core provides at least one interface slot for each VPCR. For VPCR1, the interface slot specifies the connectivity between the VPCR1 and the core.

With reference to FIG. 3, the VPCR1 may include resources such as a video switcher, an audio mixer, one or more multiview displays, and one or more program processing engines. In one aspect, arrows shown in FIG. 3 may be bidirectional. A multiview display facilitates monitoring of multiple video sources on a single display panel. For example, such a multiview display enables a graphics operator to view not only graphics that he/she is operating, but also outputs produced by other operators (e.g., audio outputs that are operated by an audio director). The program processing engines may perform functions such as retrieving particular audio and/or video content, and performing processing of audio and/or video. The VPCR may also include one or more GFX systems and one or more digital disk recorder (DDR) source devices. The DDR devices perform video playback of stored video. The DDR may be implemented using software that is configured to perform playback of a digital video file. The provisioning of resources included in the VPCR will be described in more detail later with reference to the flow diagram of FIG. 4, and the configuring of provisioned resources will be described in more detail later with reference to the flow diagram FIG. 5.

With continued reference to FIG. 3, the configuration management performs an automated "wiring" of components both within the VPCR and to and from interface connection points on the core. The "wiring" replaces the physical wiring of hardware components, where, for example in a PCR environment, a physical cable is used to couple an input port of one hardware device to an output port of another hardware device, and instead replaces the physical connection with a digital or electronic connection, similar to a pointer from a first location to a second location.

In a cloud computing environment, such physical cabling may be effectively replaced by configuring components implemented by software. For example, the automated routing may be performed, such that core interface output streams are connected to corresponding pre-specified inputs of the video switcher, the audio mixer, and multiview display systems. In a similar manner, automated routing may be performed internally within a VPCR, such that resources such as GFX, DDR and downstream program processing, are similarly connected to resources such as the video switcher, the audio mixer and multiview display systems.

According to aspects of the present disclosure, the noted routing is performed in an automated manner. For example, resources of a VPCR are provisioned in an automated manner without requiring manual (human) operation or intervention beyond the providing of certain input information, as described earlier with reference to FIG. 2. Such VPCR resources are also configured to be coupled to one another, without requiring manual operation or intervention. The automated configuration of such resources may be performed via bulk configuration tasks. In an aspect, the configuration manager may have a list of potential resources, such as the video switcher, audio mixer, GFX, DDR, etc., that may be dynamically provisioned for a VPCR. For each resource, the configuration manager may have a configuration file listing inputs and outputs associated with the resource. To automatically configure the digital wiring or the digital connections, the configuration manager may determine the number and types of resources required as determined by the user input, and based on the configuration file determine how to wire resources within the VPCR and between the VPCR and the core. For example, if one GFX and one DDR is required, where the GFX and DDR each have 8 bit outputs (or outputs of another bit length) according to the configuration file, then the configuration manager may determine that a video switcher is needed and the first 16 bits of input for the video switcher are mapped for communication with the core, the next 8 bits of input are mapped to the output from the GDX, and the next 8 bits of input are mapped to the output from the DDR. The video switcher inputs may be modified as a multiple of the number of GFX, DDR, and other resources required.

As also illustrated in FIG. 3, outputs produced by the VPCR (e.g., downstream program outputs and return feeds) are connected to inputs of the corresponding core VPCR interface. Although the VPCR1 in FIG. 3 lists specific resources most likely to be used in a VPCR environment, other resources or combination of resources may also be deployed.

Figure 4:
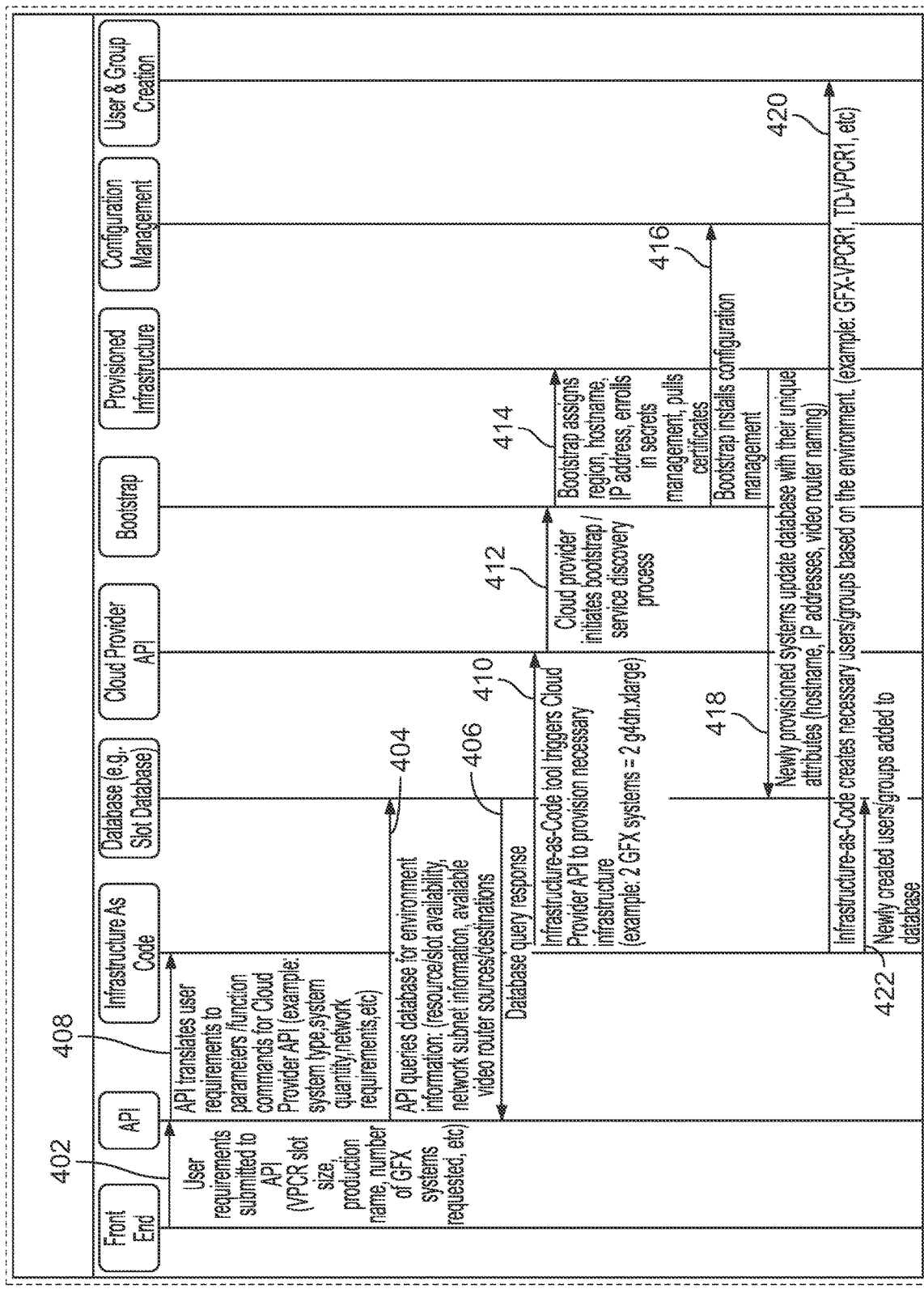
FIG. 4 is a flow diagram illustrating a process of providing an instantiation of a VPCR (e.g., including infrastructure thereof) according to at least one embodiment.

FIG. 4 is a flow diagram illustrating a process of providing an instantiation of a VPCR (e.g., including infrastructure thereof) according to at least one embodiment.

At a front-end point, a request for information is presented via a graphical user interface. The front-end endpoint may be a desktop, mobile computing device, or any suitable computing device connected to the Internet. Requesting information may include requesting a new set of information (e.g., for a new television program). Alternatively (or in addition), requesting information may involve requesting an editing of information that was previously submitted (e.g., with respect to a television program for which a VPCR was previously created). For example, for a previously created show, a user may edit information that had been previously submitted for VPCR instantiation.

Information submitted in response to the information request provided via the GUI may include information pertaining to user requirements regarding a VPCR environment that is to be instantiated. Such requirements may include a VPCR slot size, a production name, a number of GFX systems requested, a number of audio systems requested, etc. The VPCR slot size may correspond to a size of the VPCR to be instantiated. The production name may correspond to a title of media content (e.g., title of a live television program) that is to be produced using the VPCR.

Other information may also be requested and provided, such as a quantity and type of systems that need to be provisioned. For example, such information may include a number of graphics operators or analysts that will be participating in the production, a number of graphics channels that will be required or produced. Based on such information, a number of graphics playback devices that is required may be deduced.

Referring to FIG. 4, at arrow 402, information received at the front-end endpoint is provided to an API (e.g., a Cloud Platform API). The API may translate the user requirements into parameters and function commands such as system type, system quantity, network requirements, etc. After determining the technical resources and environment needed to satisfy the user requirements, the API may proceed to arrow 408.

With reference to arrow 408, the API translates user requirements (e.g., the user requirements received at arrow 402) to parameters and/or function commands that a Cloud Provider API is capable of deciphering. Examples of such parameters may include system type, system quantity, network requirements as requested by the user, etc.

As illustrated in FIG. 4, the API translation is provided to Infrastructure-as-Code (IaC). IaC may refer to a process in which data centers are provisioned and managed via scripts and/or declarative definitions, rather than manual processes or tools. IaC prioritizes factors including automation, efficiency, versioning and reusability.

At arrow 404, the API sends one more queries to a database. Alternatively, the one or more queries may be sent by the IaC. Here, the database may be queried for information pertaining to the environment that is to be instantiated: e.g., resource/slot availability, network subnet information, available video router sources, available destinations, etc. The database may be a Slot Database that is capable of communicating with a database (e.g., Router Database) that will be described later with reference to FIG. 5. Alternatively, the database illustrated in FIG. 4 and the database illustrated in FIG. 5 may be a single entity (e.g., Slot/Router Database).

At arrow 406, responses to the queries are sent to the API.

It is understood that the queries of arrow 404 and/or the responses of arrow 406 may be sent in series (e.g., over a series of individual transmissions). Alternatively, the queries of arrow 404 and/or the responses of arrow 406 may be sent in parallel. With reference to arrow 410, the IaC triggers a Cloud Provider API to provision necessary infrastructure. For example, if the information received at arrow 402 indicated a request for two Vizrt graphics systems, the IaC triggers the Cloud Provider API to request, in AWS nomenclature, two g4dn.xlarge systems running on a particular operating system (e.g., Windows) with the specifications requested by the user. Other nomenclatures may also be used.

Accordingly, the Cloud Provider API assembles the requested systems. For example, with reference to arrow 412, the Cloud provider API initiates a bootstrap process and/or a service discovery process.

With reference to arrow 414, the bootstrap process assigns certain parameters (e.g., region, hostname and IP address), enrolls in secrets management, and retrieves certificates (e.g., certificates relating to security and/or authentication).

With reference to arrow 416, the bootstrap process installs a configuration management tool. Operations performed by the configuration management tool will be described in more detail later with reference to the flowchart of FIG. 5.

With reference to arrow 418, one or more newly provisioned systems provide the database (e.g., the slot database or the slot/router database) with attributes pertaining to themselves (e.g., hostname, IP addresses, video router naming). The database may store such information for later retrieval and/or use.

With reference to arrow 420, the IaC creates accounts for users or groups based on the environment (e.g., a user identifier (ID) of GFX-VPCR1 for a graphics operator, a user ID of TD-VPCR1 for a technical director, etc.)

With reference to arrow 422, information regarding the user/group accounts (e.g., that were newly created at arrow 420) is provided to the database (e.g., the slot database or the slot/router database).

Figure 5:
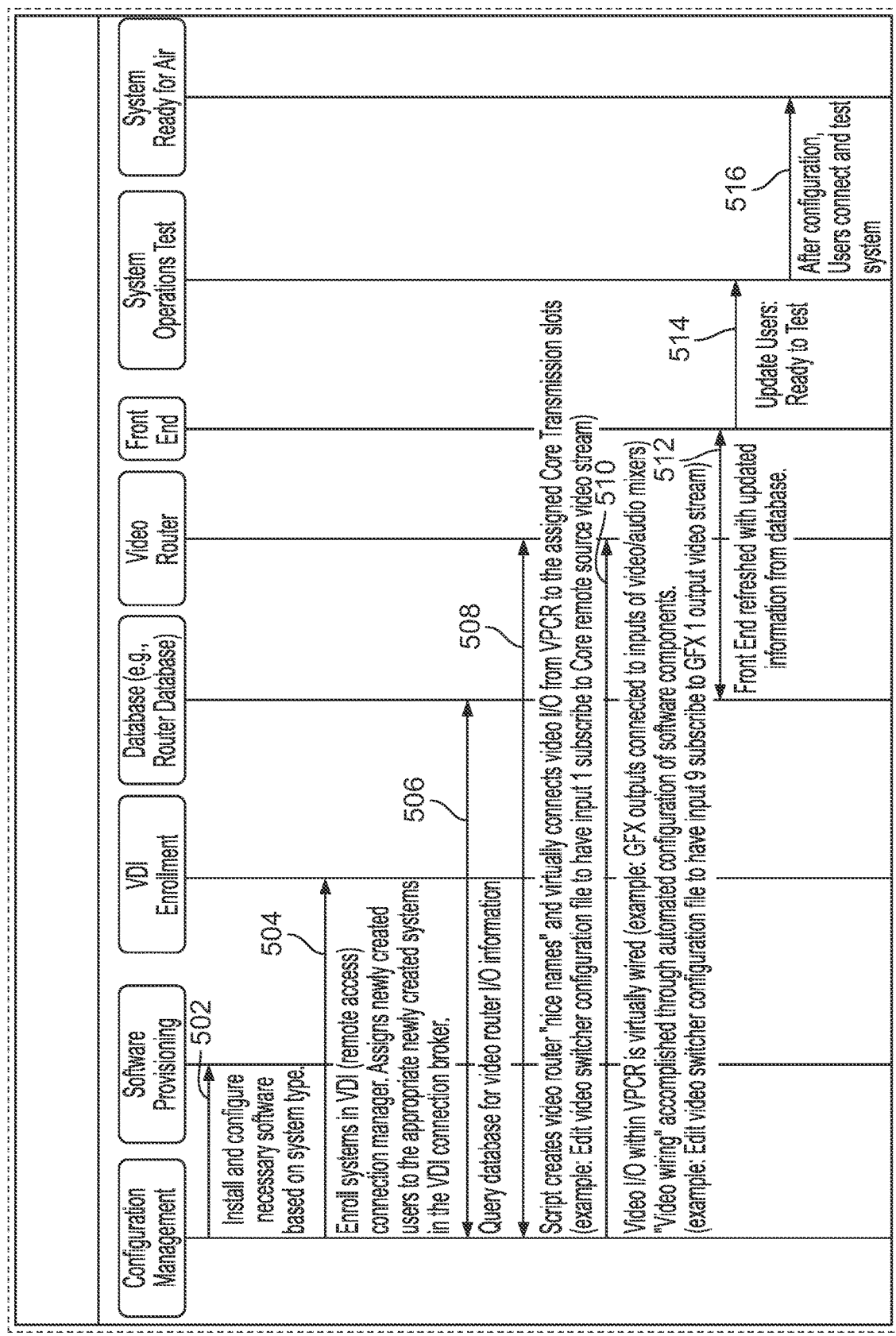
FIG. 5 is a flow diagram illustrating a process of configuring a provisioned system (e.g., a newly provisioned VPCR) according to at least one embodiment.

FIG. 5 is a flow diagram illustrating a process of configuring a provisioned system (e.g., a newly provisioned VPCR) according to at least one embodiment.

At arrow 502, the configuration management (or configuration management tool) installs and configures necessary software based on system type. By way of example, a graphics system would receive graphics software (e.g., Vizrt software or Ross video software). As another example, an audio system would receive the appropriate audio applications. As another example, a video switcher would receive operating system software (e.g., Windows) and the appropriate video switcher software. A system may have multiple types of software as described.

At arrow 504, the configuration management enrolls systems in virtual desktop connection manager for purposes of facilitating remote access. As an example, the cloud-based infrastructure of a VPCR may use Virtual Desktop Infrastructure (VDI) technology but other virtual desktop technologies may also be implemented. Using VDI technology, workstation simulators may be provided to users such as artists and editors. The workstation simulators are configured to connect to cloud-based virtual desktops. Accordingly, a user may use the virtual desktop via the workstation simulator to perform tasks associated with media creation.

Regarding the arrow 504, the configuration management assigns newly created users to the newly created systems, as appropriate, in a VDI connection broker. Such a brokering system allows users to interact with virtual machines. The configuration management may assign a particular user to one or more systems based on a role of that user. For example, in the area of graphics, multiple graphics systems may be required. By way of example, a first graphics system may control an entire window that is to be displayed (e.g., on a television), while a second graphics system may control graphics that are to be displayed on only a bottom portion of the window (e.g., a lower one-third portion of the entire window). Here, it is possible that the first graphics system is created for operation by a first graphics operator and the second graphics system is created for operation by a second graphics operator. In other words, the two graphics systems are to be operated by different individuals.

In this regard, the configuration management may assign the second graphics operator to one or more systems based on the role of that individual (e.g., controlling graphics that are to be displayed on only a bottom portion of the window). For example, the configuration management may assign, to a user account of the second graphics operator, specific credentials for accessing the second graphics system. However, the configuration management may not necessarily assign, to the second graphics operator, specific credentials for accessing the first graphics system. This is because the role of the second graphics operator involves controlling graphics that are to be displayed on only a bottom portion of the window). Instead, specific credentials for accessing the first graphics systems may be assigned to a user account of the first graphics operator. As such, specific permissions governing access to particular VPCR resources may be granted based on roles of particular operators. That said, an operator may have credentials associated with the first graphics operator and the second graphics operator to achieve a higher level of access.

At arrow 506, the configuration management queries the database for video router I/O information, and receives corresponding responses from the database. In one aspect, the database may be a Router Database that is capable of communicating with another database (e.g., Slot Database) described earlier with reference to FIG. 4. Alternatively, the database illustrated in FIG. 5 and the database illustrated in FIG. 4 may be a single entity (e.g., Slot/Router Database). With reference to FIG. 5, the database responses are received by the configuration management. Alternatively, the database responses are received by a router check-in application that is capable of communicating with the configuration management.

With reference to arrow 508, the configuration management creates (e.g., via a script), user-friendly names for ease of reference with respect to the video router I/O. In addition, the configuration management virtually connects video I/O from the VPCR to the corresponding assigned Core Transmission slot (e.g., the VPCR 1 Interface, the VPCR 2 Interface of the Core in FIG. 3). By way of example, a video switcher configuration file may be edited such that a particular input (e.g., "input #1") of a video switcher (see FIG. 3) is subscribed to a particular remote video stream of the Core.

With reference to arrow 510, the video I/O within VPCR is virtually wired. For example, particular GFX outputs may be connected to particular inputs of video/audio mixers. In this regard, video "wiring" may be accomplished via automated configuration of software components. For example, the video switcher configuration file may be edited such that a particular input (e.g., "input #9") of the video switcher is subscribed to a particular output ("output video stream #1") of the provisioned GFX system. In this regard, it is understood that the wiring information may be provided to the database (e.g., Router Database or Slot/Router Database).

With reference to arrow 512, the front end is refreshed with updated information from the database.

With reference to arrow 514, the front end informs users that the provisioned systems are ready for test. For example, the front end may inform users of the host name of the systems that were provisioned, the corresponding IP addresses, and the graphics system(s) and associated wiring/connections. Also, the front end may inform the users of user/group accounts that were created for purposes of logging in to the systems.

With reference to arrow 516, once the configuration management has completed configuration, then one or more users may connect to and test the newly configured system (e.g., using VDI technology).

Referring to FIG. 1, once VPCRs have been spun up, resources have been allocated and configured within one or more VPCRs, and user accounts for accessing the VPCRs have been configured, the VPCR may be used for content production. For example, production operators may access the VPCR via the core via a portal by submitting login credentials. A user's login credentials may be associated with one or more VPCR identifiers, giving the user access to a specific VPCR and its resources based on the user's role. As previously discussed, depending on the role of the production operator, access to different resources within or to data associated with the VPCR may be restricted.

Users acting as a remote video source may also login to the core, where the login credentials are similarly associated with one more VPCR identifiers. Data transmissions between users and the core, between the core and the VPCR, and between the core and master control for sending data to an internet stream or traditional broadcast distribution station may include VPCR identifiers so that the videos uploaded by a user can be routed to the correct VPCR, and so that video downloaded, accessed, or controlled by the production operators for eventual program video output to the master control for internet streaming or traditional broadcast distribution can be identified and routed correctly.

In an aspect, a user may simultaneously access multiple VPCRs. In this aspect, the user interface on the core may allow the user to specify which VPCR to access, based on the user's profile, for purposes of transmitting video to the VPCR or editing or controlling video associated with the VPCR. In another aspect, multiple VPCRs may be leveraged to produce content, and the core may act as an intermediary interface between VPCRs for purposes of controlling access to and exchanging content. In another aspect, the core may store user-specific preferences, including preferred graphical user interface layouts, color schemes, and information configured or selected by the user.

Figure 6:
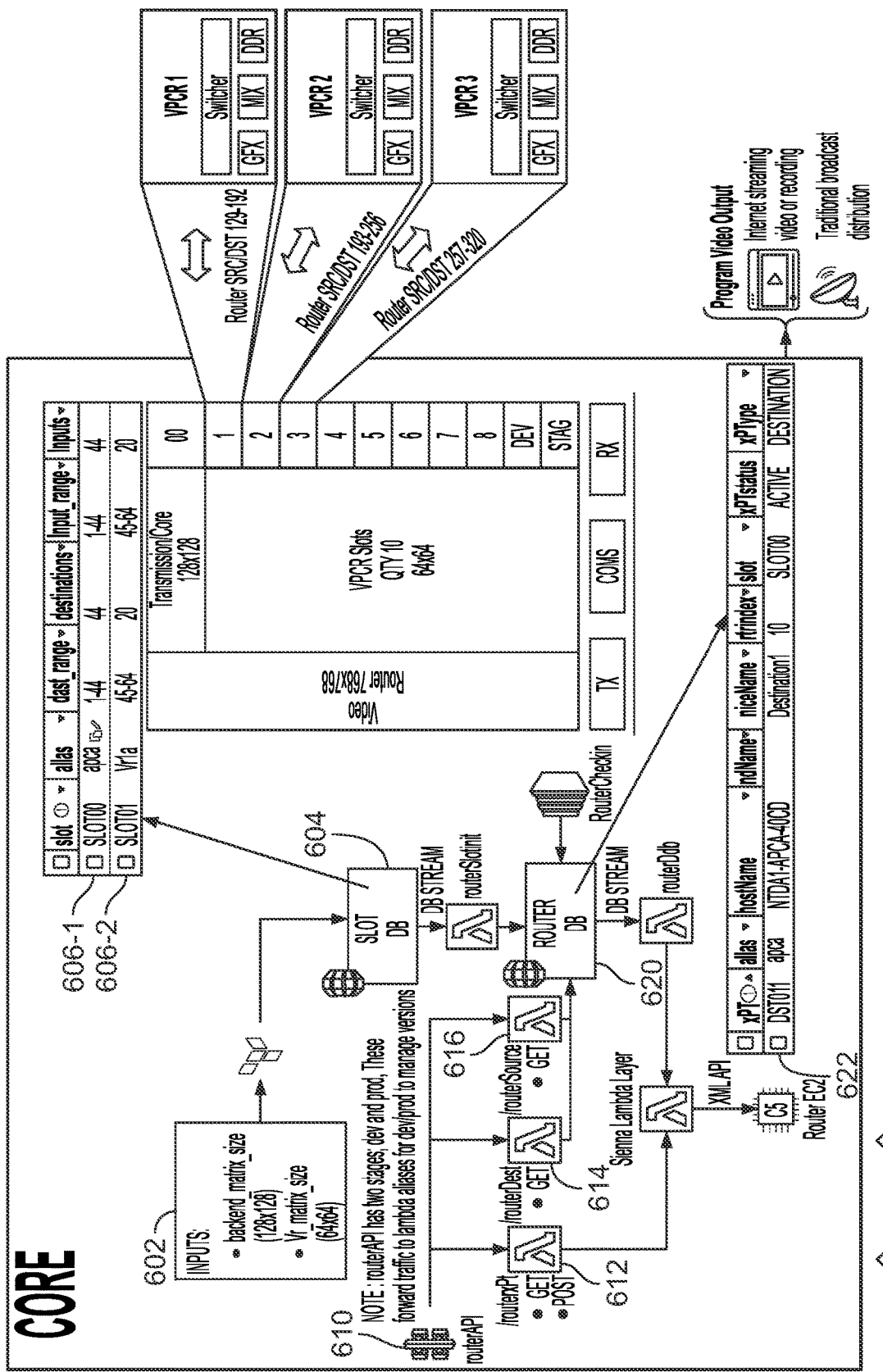
FIG. 6 illustrates an example of creating a facility infrastructure that resides in a core according to at least one embodiment.

FIG. 6 illustrates an example of creating a facility infrastructure that resides in a core according to at least one embodiment. The facility may be a broadcast facility. The infrastructure is created to facilitate creation of one or more VPCRs.

The creation of the infrastructure may be based on one or more inputs 602. The inputs 602 may include or may be similar to the information described earlier with reference to arrow 402 of FIG. 4. For example, the inputs 602 may include a backend_matrix_size (e.g., 128×128) and a vr_matrix_size (e.g., 64×64). The backend_matrix_size corresponds to a number of sources (e.g., 128) and destinations (e.g., 128) that are allocated to the back end of a core (or a video router). The vr_matrix_size corresponds to a number of sources (e.g., 64) and a number of destinations (e.g., 64) that are allocated to each room (or slot) within a video router. The infrastructure may be created to have a transmission/core of 128×128 for systems that reside in the core (other sizes such as 64×64 or 256×256 may also be possible). In one example, each slot is configured to accommodate 64 inputs and at most 64 outputs. In the example illustrated in FIG. 6, the facility is created to accommodate 10 slots (e.g., 10 VPCRs).

Infrastructure creation for two slots will be described in more detail below. As will be described, the creation occurs in an automated (or autonomous) manner based on operation of one or more APIs. In this manner, a system may be checked in and assigned to an input/output of a control room.

Information regarding one of the slots will be described with reference to entries 606-1, 606-2 of a slot database 604. The entries 606-1, 606-2 may have a form similar to entries of a spreadsheet. Each entry 606-1, 606-2 include information populated when a respective slot is created within a transmission/core or video router. According to entry 606-1, a first slot having a slot identifier of "SLOT00" has an alias of "apca." This first slot is configured to accommodate a total of 44 inputs (ranging from input #1 to #44) out of a possible number of 64 inputs, and a total of 44 outputs or destinations (ranging from destination #1 to #44) out of a possible number of 64 outputs. According to entry 606-2, a second slot having a slot identifier of "SLOT01" has an alias of "vr1a." This second slot is configured to accommodate a total of 20 inputs (ranging from input #45 to #64) out of possible number of 64 inputs, and a total of 20 outputs or destinations (ranging from destination #45 to #64) out of a possible number of 64 outputs. The creation of the entries 606-1, 606-2 in the slot database 604 may be created using processes described earlier with reference to arrows 404, 406, 408, 410, 412, 418, 424 of FIG. 4.

Based on the information in the entry 606-2, a source (e.g., video output of a particular camera or recording device) may be checked into the second slot ("vr1a") and assigned an input (ranging from input #45 to #64) and optionally an output (ranging from input #45 to #64).

One or more embodiments utilize a router (e.g., the video router of FIG. 5 to which arrows 508 and 510 lead). Such a router effectively couples inputs or outputs and will now be described in more detail with reference to a traditional router.

A traditional router routes video signals from multiple input sources such as cameras, computers, etc., to one or more outputs such as display devices (e.g., monitors, projectors, televisions, etc.). Connections to such a traditional router may be made using BNC (Bayonet Neill-Concelman) connectors of coaxial cables. Using a traditional router, MDI (medium dependent interface) sources and MDI destinations may be coupled to each other.

Embodiments of this disclosure control a router that, unlike a traditional router, does not necessarily perform cross points switching similar to that performed by the traditional router. Rather, the router effectively issues a pointer (or pointer information), e.g., to a destination seeking to subscribe to a source, or vice versa.

In FIG. 6, the control of the router is illustrated is achieved using automated processes (e.g., automated processes 612, 614, 616) that are performed by a router API 610. As will be explained in more detail below, the processes 614 and 616 create entries in a router database 620. The router database 620 stores individual entries corresponding to individual inputs or outputs that are effectively coupled by the router. As such, the router is controllable (or programmable) by the router API 610 via processes such as processes 614 and 616. In such a manner, the router API 610 can control the router to couple sources into or destinations out of a VPCR, as described in this disclosure.

As will be described with reference to an example entry, the router database 620 includes not only pointer (e.g., switching) information for a given source or destination, but also contextual information. Such contextual information may include, e.g., a user-friendly name of the source or destination, a name of the room (e.g., VPCR) to which the source or destination is associated, a name of the slot and/or facility to which the source or destination is effectively coupled, or any of the fields stored within a slot database and/or router database. The contextual information may include any combination of such pieces of information. Accordingly, the contextual information may indicate where a particular source is to be directed and/or to be used.

Information regarding an example routing entry will be described with reference to entry 622 of the router database 620. The entry 622 may have a form similar to an entry of a spreadsheet. The creation of the entry 622 in the router database 620 may be created using processes described earlier with reference to arrows 506, 508, 510 of FIG. 5.

Similar to other entries of the router database 620, the entry 622 is to be associated with a particular source (e.g., source index) and a particular destination (e.g., destination index). In the example illustrated in FIG. 6, the router has a matrix of 768×768. As such, the router is capable of configuring up to 768 different sources and up to 768 different destinations. Other matrix sizes are also possible.

For example, for a particular source (e.g., the output of a particular camera or recording device), the processes 614, 616 create entry 622. This particular source is to be associated with the system "apca" described earlier with reference to entry 606-1 of the slot database 604.

The process 614 retrieves a source index for the source. For example, the process 614 queries the router database 620 for an available index. The query may include one or more environmental variables, such as inputs 602. Based on results of the query, the process 614 determines that a particular source index (e.g., source index #10 or "rtrIndex 10") is available. As such, the entry 622 is created to indicate that this source index is assigned to the particular source.

Similarly, the process 616 retrieves a destination index for the source. For example, the process 616 queries the router database 620. The query may include one or more environmental variables, such as inputs 602. Based on results of the query, the process 616 determines that a particular destination index (e.g., an index corresponding to the name "Destination1") is available. As such, the entry 622 is created to additionally indicate that this destination index is assigned to the particular source.

As illustrated in FIG. 6, the entry 622 includes not only information regarding a particular source index (e.g., rtrIndex 10) and a particular destination index (e.g., "Destination1"), but also contextual information such as the associated system ("apca") and the associated slot ID ("SLOT00") corresponding to the entry 606-1 of the slot database 604. Processes such as processes 612, 614 and 616 can obtain such information by querying the router database 620.

Because the infrastructure illustrated in FIG. 6 is created in a virtual manner, system parameters may be readily changed or reconfigured. For example, in the example illustrated in FIG. 6, each slot is configured to accommodate at most 64 inputs and at most 64 outputs. If, for example, it is determined that these numbers are not sufficiently large, then the inputs 602 may be adjusted to request larger numbers of inputs and outputs. For example, the inputs 602 may be adjusted so as to request that each slot be configured to accommodate at most 128 inputs and at most 128 outputs. Accordingly, a capacity of each slot is effectively doubled.

As shown in FIG. 6, the slot database 604 and the router database 620 may store information of differing granularity. The slot database 604 maintains a list of available and occupied slots within a video router, and for each occupied slot, indicates the slot ID, an alias, a range of inputs, a number of inputs, a range of outputs, and a number of outputs. By contrast, the router database 620 may contain more granular or specific information related to each individual VPCR associated with a particular slot. For example, the router database 620 may indicate for a particular VPCR or slot, which sources are associated with (or connected to which inputs of the VPCR, and which VPCR outputs are associated with which destinations of the VPCR. Each VPCR may have multiple sources and multiple destinations, each associated with 1 or more corresponding inputs and outputs of the slot. And as shown in FIG. 6, the entry 622 for a particular destination may also list the VPCR alias, the slot ID, and the index of the particular output from the VPCR that to point to the destination. Similar entries can be made for sources.

As illustrated in FIG. 6, multiple VPCRs (e.g., VPCR 1, VPCR 2, VPCR 3) may receive data from and provide data (e.g., data packets) to the core. For example, the core may receive data from VPCR1. The data may include, e.g., media content for which VPCR 1 has performed one or more types of processing, e.g., video switching, audio mixing and/or graphics processing. The data may also include contextual information (e.g., a control room ID, a slot ID, an alias, etc.) that serves to identify an intended recipient of the data. For example, the intended recipient may be a broadcast stream, an Internet stream, or a VPCR (see FIG. 6). The core may use the contextual information to route the data to the intended recipient. In one example, when data is being sent from a source to VPCR1 via the core, the data may include content (e.g., video and/or audio) and contextual information (e.g., slot ID or alias) the explicitly identifies VPCR1 or the contextual information may be associated with a user ID registered with VPCR1 such that when data comes from the user ID, the core knows to route the user ID to VPCR1 (based on information in the slot database, for example) and to route the data to the video switcher or audio mixer based on either a data type associated with the data or based on matching information in the router database (e.g., an input range for the router database, a source alias that is associated with particular input ranges, etc.). In another example, when data is being sent from VPCR1 to a traditional broadcast distribution center or to an Internet content distribution network via the core, the data from VPCR1 may include content and also contextual information that identifies VPCR1 and a destination associated with VPCR1. Upon receiving the data, the core may match the destination and the VPCR1 identifier (e.g., alias name or slot identifier) using the router database with the destination (e.g., a destination alias or an output range) in order to provide the content to the destination. In yet another example, when data containing context and contextual information is being sent from one VPCR to another VPCR, based on information in the slot database 604 and the router database 620, the core may use the contextual information (e.g., control room ID, slot ID, alias, etc.) to determine that the intended recipient is another VPCR (e.g., VPCR2). Accordingly, the core may configure a virtual router to effectively route the data to VPCR2. The data (e.g., data packets) that is routed by the core to VPCR2 may include all (or a subset) of the contextual information that was received by the core. Accordingly, a first VPCR (e.g., VPCR1) may provide data to a second VPCR (e.g., VPCR 2) via the core. Upon receiving the data, the second VPCR may perform one or more types of processing, e.g., video switching, audio mixing and/or graphics processing, on the data.

Figure 7:
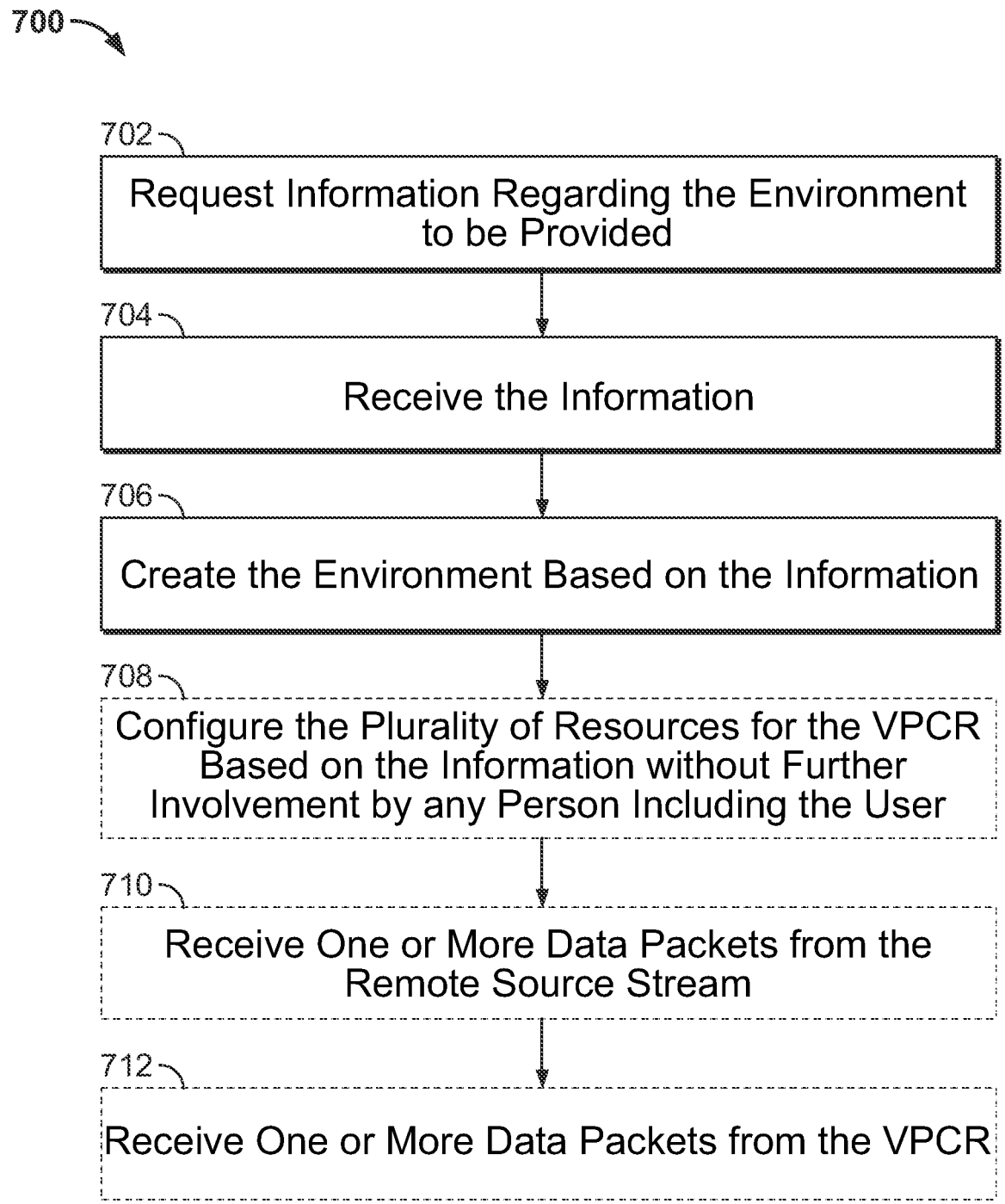
FIG. 7 illustrates a flowchart of a method of providing an environment including a VPCR for creating media content according to at least one embodiment.

FIG. 7 illustrates a flowchart of a method 700 of providing an environment including a VPCR (e.g., VPCR 1 of FIG. 6) for creating media content according to at least one embodiment.

At block 702, information regarding the environment to be provided is requested of a user. For example, information such as the information described with respect to arrow 402 (see FIG. 4) and/or the one or more inputs 602 (see FIG. 6) is requested.

At block 704, the information is received from the user (see, e.g., arrow 402 of FIG. 4). For example, the information may include size information corresponding to the VPCR, the size information specifying a number of inputs and a number of outputs for the VPCR.

At block 706, the environment is created by provisioning a plurality of resources for the VPCR from among a plurality of cloud computing resources based on the information. For example, the resources may include resources such as those described earlier with reference to arrows 410, 412, 414, 416 and/or 418 of FIG. 4.

Provisioning the plurality of resources for the VPCR may include querying a slot database (e.g., slot database 604 of FIG. 6) regarding availability of virtual slot resources for the VPCR based on the size information. In this regard, provisioning the plurality of resources for the VPCR may further include receiving, from the slot database (e.g., slot database 604), slot information regarding available virtual slot resources for the VPCR, and assigning the available virtual slot resources to the VPCR. The information may include information such as that described earlier with reference to entry 606-1 or 606-2.

At block 708, the plurality of resources for the VPCR may be configured based on the information without further involvement by any person including the user. For example, the plurality of resources may be configured by querying a router database (e.g., router database 620) regarding availability of a virtual router resource for coupling an input of the VPCR to a remote source stream or coupling an output of the VPCR to a remote destination stream.

The plurality of resources for the VPCR may be configured by receiving, from the router database (e.g., router database 620), router information regarding an available virtual router resource, and assigning the available virtual router resource to the VPCR. The information may include information such as that described earlier with reference to entry 622.

A virtual router may be autonomously configured based on the available virtual router resource, to couple the input of the VPCR to the remote source stream, and/or to couple the output of the VPCR to the remote destination stream. Autonomously configuring the virtual router may include subscribing the input of the VPCR to the remote source stream, and/or subscribing the output of the VPCR to the remote destination stream.

The virtual router may be autonomously configured to couple the input of the VPCR to the remote source stream. For example, the input of the VPCR may be coupled to another VPCR. In this regard, the remote source stream may be coupled to an output of a second VPCR (e.g., VPCR 2 of FIG. 6). Alternatively, the input of the VPCR may be coupled to one or more remote sources.

At block 710, one or more data packets may be received from the remote source stream. The one or more data packets may include contextual information corresponding to the virtual resources assigned to the VPCR, the contextual information including at least a slot identifier or an alias corresponding to the VPCR. The contextual information may include information that corresponds to information stored by the slot database 604 and/or the router database 620.

The virtual router may be autonomously configured to couple the output of the VPCR to the remote destination stream, and the remote destination stream may be coupled to a broadcast network or to a second VPCR (e.g., VPCR 3 of FIG. 6). At block 712, one or more data packets may be received from the VPCR. The one or more data packets may include contextual information corresponding to the virtual resources assigned to the VPCR, and the one or more data packets may be routed to the broadcast network or to the second VPCR in the remote destination stream based on the contextual information.

Figure 8:
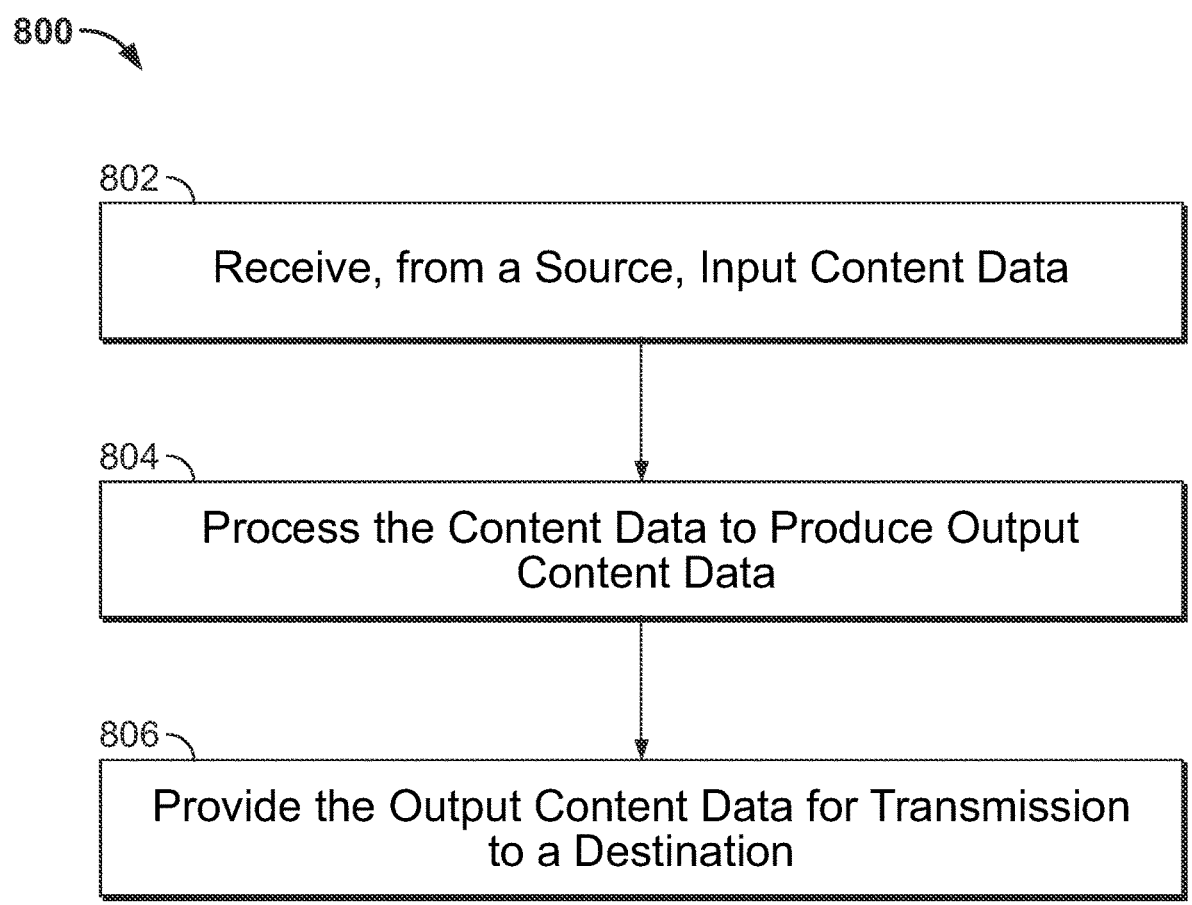
FIG. 8 illustrates a flowchart of a method of providing content at a VPCR provisioned by a plurality of cloud computing resources according to at least one embodiment.

FIG. 8 illustrates a flowchart of a method 800 of providing content at a VPCR (e.g., VPCR 1 of FIG. 6) provisioned by a plurality of cloud computing resources according to at least one embodiment.

At block 802, input content is received from a source. In one example, referring to FIG. 1, the source may be an Internet camera feed, a chat service, a live video source, a remote file source, etc. In another example, the source may include a second VPCR. In this example, with reference back to FIG. 6, media content is received at VPCR 1 from VPCR 2, via the core.

At block 804, the content data is processed to produce output content data. The processing may include processing described herein with reference to that performed at production control rooms. For example, processing the content data may include performing one or more of video switching, audio mixing, and/or graphics processing using the content data.

The output content data may include a plurality of data packets, each of the plurality of data packets including contextual information, and the contextual information including at least a slot identifier or an alias corresponding to a destination.

At block 806, the output content data is provided for transmission to the destination.

The destination may include a broadcast network, an Internet streaming entity, or a third VPCR. For example, with reference back to FIG. 6, the output content data is provided to the core for transmission to VPCR3, a traditional broadcast distribution facility, or a server associated with a content distribution network.

Figure 9:
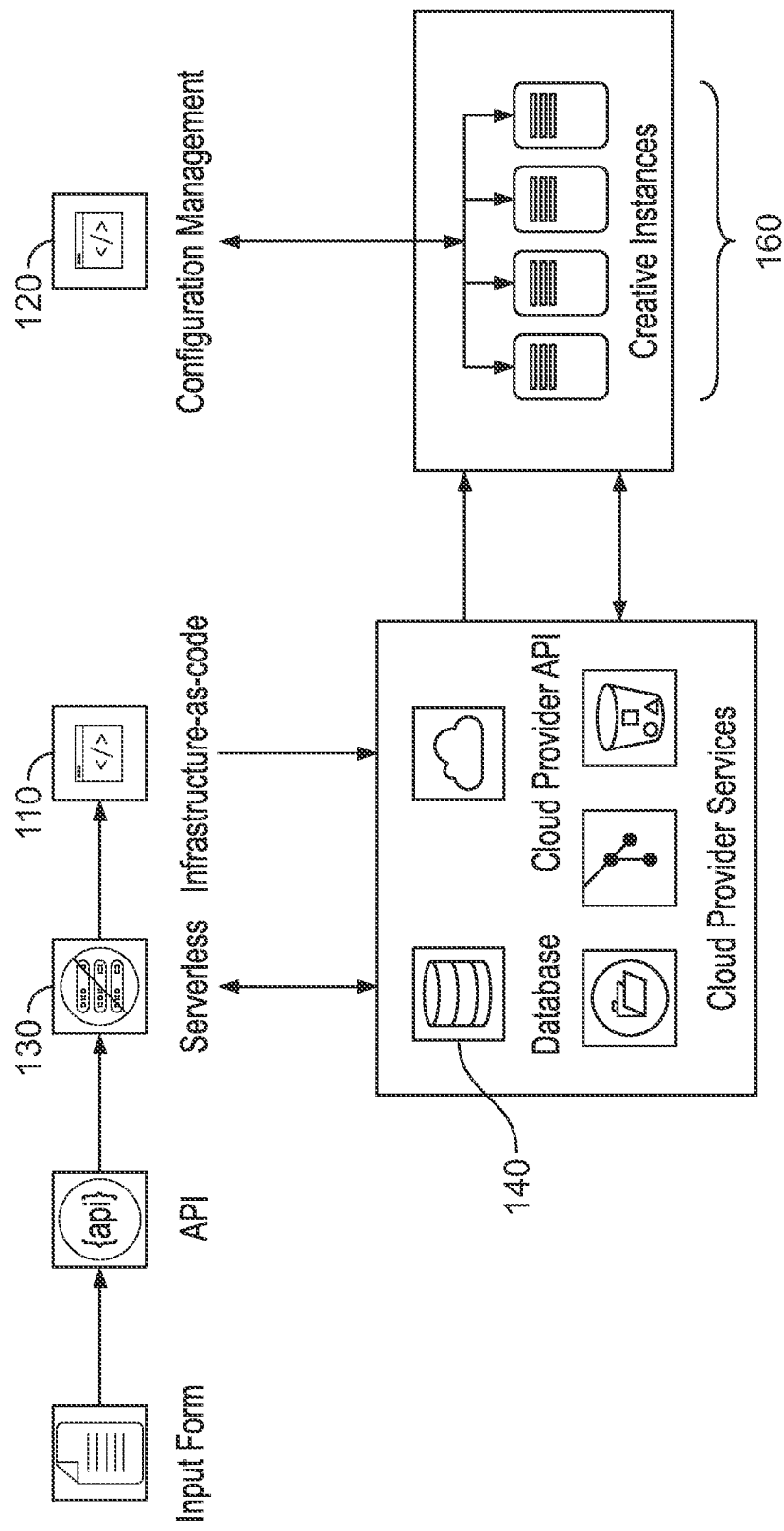
FIG. 9 is a block diagram illustrating providing of a production environment according to least one embodiment.

According to aspects of the present disclosure, various cloud-based technologies and/or methodologies may be employed. With reference to FIG. 9, these technologies/methodologies may include: infrastructure-as-code 110; configuration management 120; serverless functions 130; and database(s) 140.

Infrastructure-as-code (IaC) 110 refers to a process in which data centers are provisioned and managed via scripts and/or declarative definitions, rather than manual processes or tools. Infrastructure-as-code 110 prioritizes factors including automation, efficiency, versioning and reusability. According to various embodiments, infrastructure-as-code 110 is utilized to automate and/or orchestrate a providing of a production environment, as will be described in more detail later with further reference to FIG. 10.

Configuration management 120 refers to a process of automating deployment and configuration of settings and software for both physical machines and virtual machines (e.g., virtual desktops). Configuration management 120 may be used to concurrently deploy software or configurations to multiple systems. Configuration management 120 may be aligned and/or used in conjunction with infrastructure-as-code 110.

Figure 10:
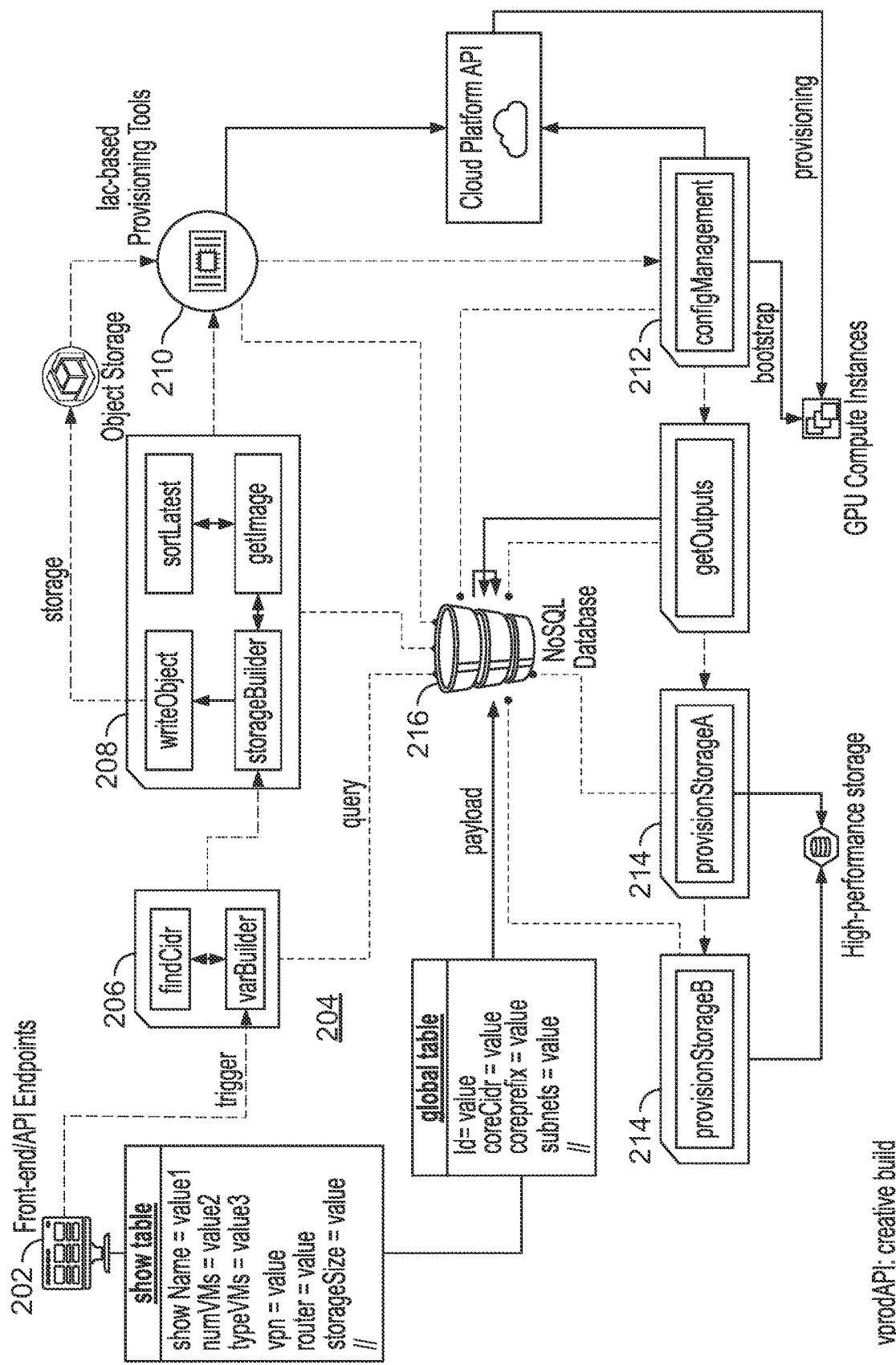
FIG. 10 is a block diagram illustrating creating of a production environment according to least one embodiment.

Before FIG. 10 is described in more detail, it is noted that high-performance computing workstations may be used in the production of media content (e.g., graphic art, editorial content, television programs for either broadcast or other forms of distribution, etc.). Computing infrastructure (e.g., workstations) that is typically used to facilitate production of media content may be associated with various disadvantages and/or drawbacks. For example, acquiring such infrastructure may require relatively high capital costs. By way of example, a single workstation (e.g., a single high-performance workstation) may cost approximately $10,000 in hardware costs alone. Further, the workstation may need to be replaced based on a particular refresh cycle (e.g., a three-year refresh cycle). The ordering, wiring, installation and configuration of such hardware consumes time, which may be considered as a cost of an additional type.

With continued use, the workstation may also require significant resources relating to maintenance. For example, hardware failures require a certain amount of down time to diagnose issues and perform repairs, which involve tasks such as troubleshooting of software, replacement of hardware, etc. Such tasks are typically performed by technical professionals having specialized training.

Over time, the hardware that is implemented in the workstation may eventually limit the software that can be run or executed using the hardware. For example, over the course of a particular refresh cycle, it is possible that the hardware that is in use becomes incapable of efficiently running newer software or newer software versions (e.g., the most recent Adobe Creative Cloud software/features).

As another example, memory storage costs may be quite high. Media creation typically requires (or at least benefits from) interfacing with high-performance storage media (e.g., servers, etc.). Such storage devices are typically quite expensive and may require frequent upgrades to keep up with storage demands. Also, such storage devices may also need to be replaced based on a particular refresh cycle (e.g., a three-to-five-year refresh cycle).

In addition to the costs that have been described, portability may present additional disadvantages and/or drawbacks. For example, a location at which a particular workstation is installed, may need to be pre-wired with fiber cabling. As another example, to use the workstation, a user (e.g., an artist, an editor) is generally required to be physically present at the installation location. In many situations, the user is unable to use the workstation while physically located at some other location (e.g., a home office, a different office location, etc.).

Aspects of the present disclosure are directed to addressing one or more of the noted disadvantages and/or drawbacks. According to one or more aspects, a cloud-based infrastructure model is used. By way of example, the cloud-based infrastructure model may use Virtual Desktop Infrastructure (VDI) technology. For example, workstation simulators may be provided to users such as artists and editors. The workstation simulators are configured to connect to cloud-based virtual desktops. Accordingly, a user may use the virtual desktop via the workstation simulator, to perform tasks associated with media creation.

In at least some embodiments, the VDI technology handle technical/processing specification requirements for handling media production workflows. Such specification requirements may relate to GPU (graphics processing unit) utilization, frame rate, color representation, etc. According to one or more aspects, GPU-enabled cloud-based virtual machines, dynamically scalable high-performance cloud-native storage and/or infrastructure-as-code methodologies are utilized to facilitate full end-to-end media production workflows.

According to aspects of the present disclosure, backend systems (including directory service (e.g., Active Directory), connection broker, shared user storage, etc.) and/or artist/editor desktops are hosted in the cloud. Artist/editor desktops may be created on demand with a particular systems image (e.g., a latest Windows image). Additionally, the created desktops may be non-persistent. In this regard, the desktops may be readily "destroyed" when not in use. The "destroyed" desktops may be recreated at a later time when needed again.

User data (desktop, documents, etc.) may reside on shared user storage. Folder redirection allows an artist or editor to access his/her personal data from any of various machines (e.g., workstation simulators). As such, an artist or editor who works remotely may utilize a VPN (Virtual Private Network) to access his/her workstation(s) in a secure manner. For example, a remote artist working from a home office can connect to his/her workstation(s) via the Internet.

A process for providing a production environment according to at least one embodiment will now be described with reference to FIG. 10.

A request for information is presented via a GUI at a front-end endpoint 202. The front-end endpoint may be a desktop or mobile computing device connected to the Internet. Information that is requested via the GUI may include a name of a show or program (to be created using the production environment that is to be provided), a type of compute instances (e.g., artist workstation, editor workstation) that is to be created, a corresponding number of compute instances, required storage size, and/or whether a VPN is needed.

Information provided in response to the request is received. For example, the information is received from the front-end endpoint 202. It is understood that the response may specify multiple types of compute instances (e.g., both artist workstations and editor workstation) and, correspondingly, the number of compute instances for each type.

The information that is provided is input to one or more serverless functions (e.g., serverless functions 130 of FIG. 9). With reference to FIG. 10, the serverless functions may include varBuilder 204, findCidr 206, storageBuilder 208, IaC-based provisioning tools 210, configManagement 212 and/or provisionStorage 214. The one or more serverless functions may output information to a database (e.g., database 140 of FIG. 9). With reference to FIG. 10, the serverless functions may output information to a centralized cloud database 216.

The function varBuilder 204 uses the provided information to configure downstream processes. The function findCidr 206 discovers available network ranges and allocates the discovered network ranges for the new production environment. The function storageBuilder 208 uses cloud provisioner templates to build high-availability storage clusters. The IaC-based provisioning tools 210 provision cloud-based computing resources by utilizing a particular systems image (e.g., a latest Windows image) and triggering a Cloud Platform API (application programming interface) 218. The function configManagement 212—is then used to complete the provisioning of the endpoints (e.g., by installing software, registering systems with Directory Services, setting Group Policy, Folder Redirection, etc.) The function provisionStorage 214 controls configuration of high-performance storage for use by users such as artists and editors.

By way of example—according to at least one embodiment, a request for information is provided via a GUI. The GUI may be configured such that it can be completed by a non-technical user. For example, the GUI may be configured to request information that is not overly technical—e.g., a number of graphic artists (e.g., Photoshop artists, After Effects artists) and a number of editors that will be working to create the media content. The GUI may also be configured to request information regarding an amount of high-performance memory storage that is desired and/or required. The GUI may also be configured to request the name of the show/program on which the artists and editors will be working.

A response is received from the user. For example, the response may provide the information noted in the previous paragraph—e.g., a particular number of graphic artists and a particular number of editors that will be working to create the media content, the amount of high-performance memory storage that is desired and/or required, the name of the show/program on which the artists and editors will be working.

The receipt of the response triggers an autonomous providing of a production environment to facilitate production of the show/program. For example, the production environment may include backend infrastructure, virtual networks, storage devices and/or VDI desktops that are suitable for facilitating production of the show/program based on the information provided by the user. In this regard, the number of VDI desktops (e.g., VDI workstations) that are created may be based on the number of graphic artists and the number of editors that were indicated. For example, the number of VDI desktops that are created may equal a particular value retrieved from a look-up table, where the particular value corresponds to the number of graphic artists and the number of editors that were indicated. As a further example, the particular value may reflect a number of VDI desktops that is estimated to be needed by the indicated numbers of personnel (e.g., graphic artists and editors).

Based on the response from the user, instances of workstations are created to reside in a cloud data center. The number of instances is commensurate with the determined number of workstations.

In another example, users may not explicitly specify the number of users expected to participate in the production. The user may instead provide other information regarding production that will require the system to more intelligently determine the type and amount of resources to allocate. In one aspect, this information may include the type of media content to be created such as whether it will be a television show, a live action film, an animated film, a live sporting event, a live news event, a show meant for distribution over the Internet. Because different types of media content may require different resources, by specifying the type of media content to be created, the system may select a subset of the type of resources to allocate. In another aspect, the information may include the schedule corresponding to different milestones for creating the media content. The schedule may indicate when production is to begin and end, when post-production is to begin and end, when the show expects to be available for distribution, when the show will air, etc. By providing the schedule, the system will be able to more accurately allocate resources because if the schedule is compressed, the system may assume more people will work on the show to meet the tighter deadlines and thereby allocate more resources. That said, a show with long deadlines with many milestones may still require many people but a show with long deadlines but with a fewer number of milestones may have less priority and fewer personnel and therefore need fewer resources. In other aspects, the quality of the content may also affect the number and type of resources to be allocated. For example, shows intended for display in standard definition, high definition, 4K, 8K, and other resolutions may require different types and amounts of resources. In another aspect, if the media content is to be created in many different geographical locations, the resource allocation may also consider allocating cloud resources in different geographies and in greater consecutive time blocks because more people can be working on a project over consecutive periods of time when they are in different time zones. Further, while the foregoing disclosure has described an instance of a virtual desktop as a resource, other examples of resources are also applicable. For example, for a single virtual desktop, there may be multiple time blocks for which the desktop is allocated to a production or to a user and each one of those time blocks may be a separate resource or a group of resources. When a production involves teams from different geographies and therefore different time zones, it may be an efficient use of resources to allow the same production to use a virtual desktop for a longer period (e.g., 6 PM-6 AM Pacific) because users in Asia, for example, may be able to utilize time slots that are not normally utilized during the evening and night hours of the Pacific time zone. Further, as production demands and timelines change over time, the system may adapt to user input to support sudden increases or decreases in resources as well and the scheduling of those resources may be determined based on the techniques previously described.

A particular capacity of high-performance storage residing in the cloud data center is also reserved. The storage capacity may also be commensurate with the number of instances. For example, the storage reserved may be at least sufficient to allow the workstation instances to communicate with each other and to exchange files and other data between one another.

According to at least one embodiment, a new isolated cloud environment is created on demand with network rules to communicate with Cloud Provider Services. Artist and editor workstations may be created on demand using the latest Windows Images. Once booted, configuration management may install the software necessary for artists and/or editors to perform their tasks.

Upon completion of the automated process, the user may be presented with a dashboard providing detailed information about the newly provisioned infrastructure. For example, the dashboard may be provided at the front-end endpoint 202. The user may then be able to view/edit resources on demand. For example, the user may view IP addresses and hostnames, edit system specs, etc. The user may also add additional users (or groups of users), set access policies, and view/edit high-performance storage configuration.

As described earlier, the production environment may be provided to facilitate creation of a show (or program). Once creation of the show is completed, the resources of the production environment may no longer be needed. For such a situation, the user is afforded the ability to "collapse" the production environment at least temporarily. The "collapsing" of the environment may not involve an irreversible destruction of the production environment. Rather, a snapshot of the production environment (including all data that was created and any preferences that were defined) may be performed, and the snapshot may be archived in cloud-based storage. If needed at a later time, the production environment corresponding to the show may be "rehydrated." The data that had been created is retrieved from the archived storage, and restored to the high-performance storage of the production environment. In addition, compute resources (e.g., virtual workstations) may be recreated on demand.

As described earlier, one or more aspects of this disclosure are directed to using a cloud-based infrastructure model to provide a production environment for producing media content. The production environment is provided (e.g., customized) based on the needs of a user for creating a particular show (or program). According to at least one embodiment, the production environment is provided in an automated (or autonomous) manner, such that the providing of the environment may be considered as an automated delivery of a service for the benefit of the user.

According to one or more embodiments, ease of management may be improved. For example, the use of non-persistent desktops (e.g., VDI desktops) allow administrators to maintain one master image, instead of managing individual desktops for each user. As another example, a degree of scalability may be improved. In this regard, a cloud architecture may be scaled dynamically based on the number of users that are needed and/or working at a given time. This may serve to eliminate (or at least reduce) over-provisioning. Further, this allows administrators to add/remove resources as necessary, thereby improving cost effectiveness. Under the public cloud model, customers typically pay only for the resources (e.g., computing resources, storage resources, etc.) that are reserved and/or used.

Similar to the adding of resources, the upgrading of resources may be accomplished more readily. For example, under the public cloud model, hardware specifications that are set forth may be scaled up on demand as necessary. Similarly, software specifications may be upgraded/modified on demand. For example, when needed, a newest version of software (e.g., Adobe Creative Cloud) may be applied to the master image and deployed to workstations.

According to one or more embodiments, a degree of reliability may be improved. For example, utilizing a public cloud enables hosting workstations in different geographic availability zones. This may improve disaster resiliency and may improve accessibility regardless of the geographical location(s) at which one or more users are located. For example, because workstations are hosted in the cloud, a user may virtually access hosted workstations from any of various geographical locations (e.g., geographical locations at which a suitably secure connection can be provided). As such, it may be possible for an artist/editor to work remotely (e.g., from a home office).

According to one or more embodiments, a degree of security/protection (e.g., from hackers) may be improved. As described earlier, data associated with a show/program resides not at endpoints (e.g., a physical workstation installed at a geographic location accessible by a user) but in a cloud environment (e.g., high-performance storage in the cloud). Protecting the cloud environment may be more feasible than protecting individual endpoints. In this regard, the provided infrastructure may use machine images on which recent security patches (e.g., the most recent security patches) have been installed.

In an aspect, methods and techniques described with respect to allocating, deploying, and using resources for a virtual workstation may also be applied to a VPCR and vice versa.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for providing an environment comprising a virtual production control room (VPCR) for creating media content, the method comprising:

requesting, from a user, information regarding the environment to be provided;

receiving, from the user, the information; and creating the environment by provisioning a plurality of resources for the VPCR from among a plurality of cloud computing resources based on the received information, wherein:

the information comprises size information corresponding to the VPCR, the size information specifying a number of inputs and a number of outputs for the VPCR; and provisioning the plurality of resources for the VPCR comprises querying a slot database regarding availability of virtual slot resources for the VPCR based on the size information.

2. The method of claim 1, wherein provisioning the plurality of resources for the VPCR further comprises:

receiving, from the slot database, slot information regarding available virtual slot resources for the VPCR; and assigning the available virtual slot resources to the VPCR.

3. The method of claim 2, further comprising:

configuring the plurality of resources for the VPCR based on the information without further involvement by any person including the user.

4. The method of claim 3, wherein configuring the plurality of resources for the VPCR comprises querying a router database regarding availability of a virtual router resource for coupling an input of the VPCR to a remote source stream or coupling an output of the VPCR to a remote destination stream.

5. The method of claim 4, wherein configuring the plurality of resources for the VPCR further comprises:

receiving, from the router database, router information regarding an available virtual router resource; and assigning the available virtual router resource to the VPCR.

6. The method of claim 5, wherein configuring the plurality of resources for the VPCR further comprises autonomously configuring a virtual router based on the available virtual router resource, to couple the input of the VPCR to the remote source stream, or to couple the output of the VPCR to the remote destination stream.

7. The method of claim 6, wherein autonomously configuring the virtual router comprises subscribing the input of the VPCR to the remote source stream, or subscribing the output of the VPCR to the remote destination stream.

8. The method of claim 6, wherein:

the virtual router is autonomously configured to couple the input of the VPCR to the remote source stream; and the method further comprises receiving one or more data packets from the remote source stream, the one or more data packets including contextual information corresponding to the virtual resources assigned to the VPCR, wherein the contextual information includes at least a slot identifier or an alias corresponding to the VPCR.

9. The method of claim 8, wherein the remote source stream is coupled to an output of a second VPCR.

10. The method of claim 6, wherein:

the virtual router is autonomously configured to couple the output of the VPCR to the remote destination stream, wherein the remote destination stream is coupled to a broadcast network or to a second VPCR; and the method further comprises receiving one or more data packets from the VPCR, the one or more data packets including contextual information corresponding to the virtual resources assigned to the VPCR, wherein the one or more data packets are routed to the broadcast network or to the second VPCR in the remote destination stream based on the contextual information.

11. A system for providing an environment comprising a virtual production control room (VPCR) for creating media content, the system comprising one or more processors configured to:

request, from a user, information regarding the environment to be provided;

receive, from the user, the information; and create the environment by provisioning a plurality of resources for the VPCR from among a plurality of cloud computing resources based on the received information, wherein:

the information comprises size information corresponding to the VPCR, the size information specifying a number of inputs and a number of outputs for the VPCR; and the one or more processors are further configured to provision the plurality of resources for the VPCR by querying a slot database regarding availability of virtual slot resources for the VPCR based on the size information.

12. The system of claim 11, wherein the one or more processors are further configured to provision the plurality of resources for the VPCR by:

receiving, from the slot database, slot information regarding available virtual slot resources for the VPCR; and assigning the available virtual slot resources to the VPCR.

13. The system of claim 12, wherein the one or more processors are further configured to:

configure the plurality of resources for the VPCR based on the information without further involvement by any person including the user.

14. The system of claim 13, wherein the one or more processors are further configured to configure the plurality of resources for the VPCR by:

querying a router database regarding availability of a virtual router resource for coupling an input of the VPCR to a remote source stream or coupling an output of the VPCR to a remote destination stream;

receiving, from the router database, router information regarding an available virtual router resource;

assigning the available virtual router resource to the VPCR; and autonomously configuring a virtual router based on the available virtual router resource, to couple the input of the VPCR to the remote source stream, or to couple the output of the VPCR to the remote destination stream.

* * * * *